Nov. 6, 1923.

W. H. NICHOLLS

MOLDING MACHINE

Filed Jan. 22, 1921

Inventor
William H. Nicholls
By Davis Davis
his Attorneys

Nov. 6, 1923.

W. H. NICHOLLS

MOLDING MACHINE

Filed Jan. 22, 1921

Inventor
William H. Nicholls
By Davis Davis
his Attorneys

Inventor
William H. Nicholls
By Davis Davis
his Attorneys

Patented Nov. 6, 1923.

1,472,807

UNITED STATES PATENT OFFICE.

WILLIAM H. NICHOLLS, OF BROOKLYN, NEW YORK.

MOLDING MACHINE.

Application filed January 22, 1921. Serial No. 439,169.

*To all whom it may concern:*

Be it known that I, WILLIAM H. NICHOLLS, a citizen of the United States, and resident of the borough of Brooklyn, in the county of Kings, city and State of New York, have invented certain new and useful Improvements in Molding Machines, of which the following is a specification.

This invention relates to improvements in that type of machine shown in my Patent No. 1,277,745, dated September 3, 1918.

One of the principal objects of the invention is to simplify and improve the construction of the machine shown in the aforementioned patent.

Another object of the invention is to provide an automatic vibrating means arranged to vibrate the pattern to facilitate the drawing operation.

Another object of the invention is to provide an oil cushioning means formed of dash pots to cushion the return movement of the flask supporting means.

Another object of the invention is to provide an electric heating device below and in contact with the pattern supporting plate for heating the patterns to facilitate the pattern drawing operation.

Another object of the invention is to provide a universal flask supporting frame adapted to be adjusted to support flasks of different sizes whereby pattern plates of various sizes and form may be used without materially altering or changing the machine and without in any way altering or changing the pattern supporting means.

Other important objects and advantages of the invention will appear fully hereinafter.

Figure 1:
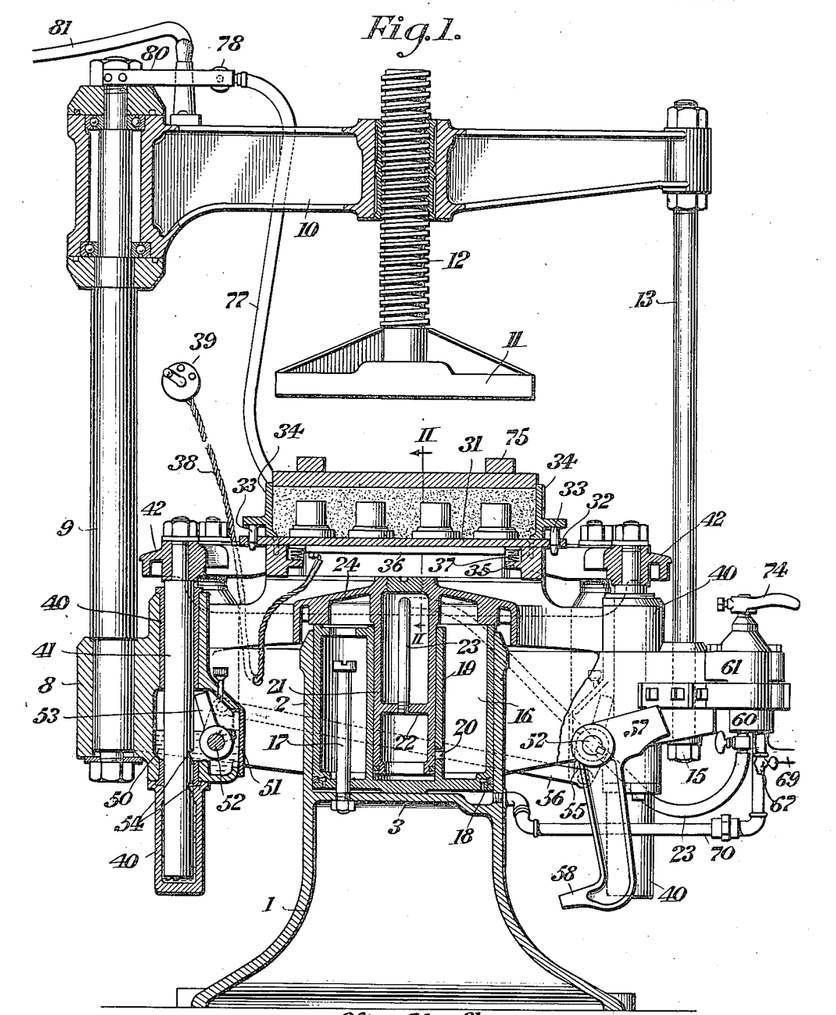
Fig. 1 is a vertical sectional view of the machine, a part thereof being shown in side elevation.

Referring to the various parts by numerals, 1 designates the base of the machine which is cut away at its forward part in order to permit the operator to stand close to the operating parts. This base carries at its upper end a vertical cylinder 2 which is open at its upper end and closed at its lower end by a horizontal wall 3. Formed integral with the cylinder 2 and the base 1, are laterally extending horizontal frames 4 and 5, said frames consisting of the side webs 6 and the end heads 7 and 8. The space between the webs 6 is open to permit the free passage of any sand that may drop when filling the flask, as hereinafter described. In the head portion 8 of the frame 4 is formed a vertical socket to receive an upstanding rigid post 9 on the upper end of which is rotatably mounted a swinging frame arm 10, said frame arm being mounted on suitably constructed ball bearings as shown in Fig. 1. The frame arm 10 carries the upper pressure head 11 which is connected to the said arm by means of a screw 12 threaded through a suitable bushing mounted in the arm. The pressure head 11 is so positioned in the arm that it may be brought directly over the center of the cylinder 2 for the squeezing operation as will be hereinafter described. In the free end of the frame arm is rigidly mounted a depending rod 13 whose lower end is adapted to enter a notch 14 in the head 7 of frame 5. On the lower end of rod 13 is screwed a clamp nut 15. When the rod 13 is in the slot 14 and the nut 15 is against the under side of the head 7, the pressure head 11 will be centered directly over the center of the cylinder 2 and will be in position to receive the thrust of the squeezing operation, and the nut 15 will take the upthrust on the arm 10 and transmit it to the base of the machine. In the cylinder 2 is fitted a large squeeze-piston 16 which is closed at its lower end and open at its upper end. The upward movement of the squeeze-piston is limited by a headed bolt 17 which is rigidly mounted in the bottom wall 3 of the cylinder and extends through an aperture in the bottom wall of the piston, as shown clearly in Fig. 1. The squeeze-piston is provided with a packing ring 18 near its lower end which is adapted to be expanded by air pressure and to bear against the inner wall of the cylinder 2. A small vertically arranged cylinder 19 is formed at the center of the squeeze-piston 16, the upper end of this cylinder being open and the lower end of said cylinder being formed by the bottom wall of the squeeze-piston. A short distance above the bottom of this cylinder is formed an exhaust port 20 which places the said smaller cylinder in communication with the interior of the larger portion of the squeeze piston and thence with the atmosphere. Mounted in the smaller cylinder 19 is a jolt-piston 21. This piston is open at its lower end and is provided with a cross wall 22, a short distance upwardly from its lower end. Extending through this cross wall is an air supply pipe 23 which leads out through the upper end of said piston and to an air controlling valve mounted on the head 7, as will be fully hereinafter described.

Formed integrally with the upper end of the jolt piston is a jolt and squeeze head 24. The lower end of this head is adapted to rest on the upper end of the squeeze-piston. Formed integrally with the head 24 are four radial diagonal arms 25 which carry vertical depending tubular sockets 29 at their outer ends. On the upper surface of the head and the arms 25 are formed ribs 26, and a rib 27 extends fore and aft of the machine. These ribs form a true horizontal support for a pattern plate holding frame 28. Said holding frame is open and rectangular, and is so arranged in the machine that its diagonals are approximately coincident with the centers of the diagonal arms 25, and the center of said holding frame is directly over the center of the jolt-piston 21. The holding frame is secured in position by screws 30 which pass through apertures in the holding frame and into the ribs 26 of the diagonal arms 25. The holes through the holding frame are slightly larger than the screws 30 to permit the holding frame to be vibrated on its support, as will be more fully hereinafter described.

The pattern plate 31 is rigidly secured to the upper side of the holding frame by screws or other suitable fastening means and said pattern plate is formed with outwardly extending ears 32 which are perforated to receive guide pins 33 on the flask member 34 of the mold. The pattern plate holding frame is formed on its inner side and at diametrically opposite points with sockets 35 adapted to receive the ends of a heating element 36 which extends across the holding frame directly under and in contact with the under surface of the pattern plate. In the sockets 35 are arranged springs 37 which force the heating element into close contact with the pattern plate. The heating element 36 is electrical, and may be of any suitable form. The circuit wires 38 are connected to the heating elements and lead to an operating switch 39 by means of which the circuits through the heating element may be controlled.

Figure 2:
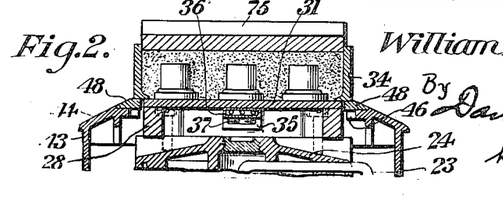
Fig. 2 a detail transverse sectional view taken on the line II—II of Fig. 1.
Figure 3:
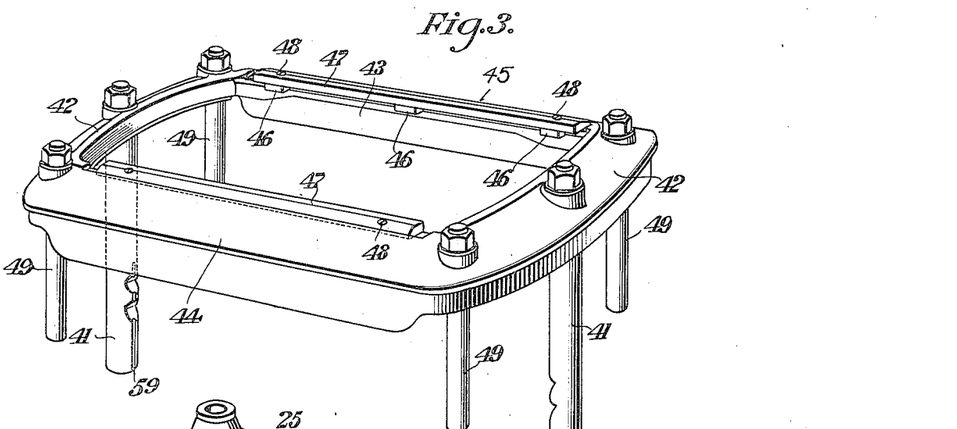
Fig. 3 a detail perspective view of the flask supporting means.
Figure 4:
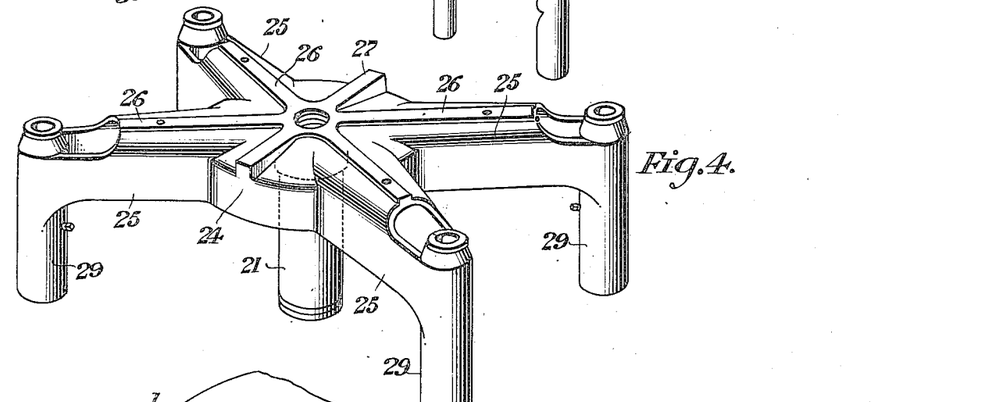
Fig. 4 a detail perspective view of the pattern supporting means and the jolt-piston.
Figure 5:
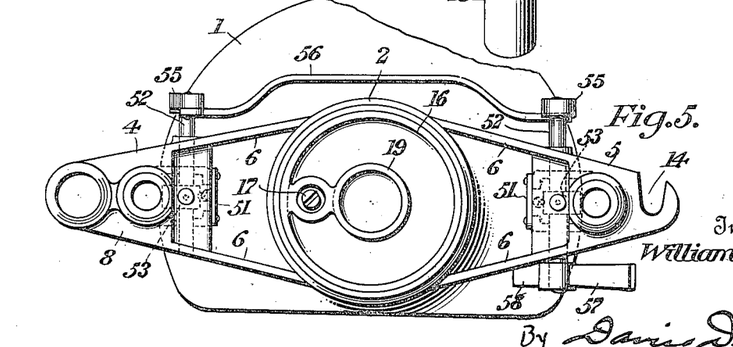
Fig. 5 a detail plan view of the base of the machine.

In the heads 7 and 8 are formed vertical sockets 40 in which are mounted vertical plunger rods 41. The upper ends of these rods are connected to the end bars 42 of the flask supporting frame 43. The end bars of said frame are connected together at their ends by the front and rear bars 44 and 45 so that the flask supporting means is an open rectangular frame having end bars and front and rear bars. This flask supporting frame surrounds the pattern plate holding frame and in its normal or at-rest position is substantially in the same horizontal plane as said holding frame. The upper inner corners of the front and rear bars of the flask supporting frame are grooved out and provided with inwardly extending lugs 46. In these grooves and resting on said lugs are arranged flask receiving rails 47, said rails being removably secured to the lugs by screws 48, or otherwise. The upper surfaces of the rails 47 are flush with the upper surface of the pattern plate when the jolt and squeeze plungers are in their lowermost positions, as indicated in Fig. 1, so that when a flask member 34 is placed in position its side edges will rest directly on the upper surface of the pattern plate, as shown in Fig. 1, and its front and rear walls will rest on the rails 47 and also on the upper surface of the pattern plate as shown clearly in Fig. 2.

Rails 47 of different widths may be used in order to adapt the flask carrying frame for use with flasks of different widths. These rails may be adjustable inwardly and outwardly by any suitable means, if desired, but it is preferred to rigidly secure them in position, using rails of different widths to secure the desired result. If desired, or necessary, the lugs 46 may be cut off and the rails 48 secured directly to the bars 44—45 of the flask frame. This would be necessary only when the flask to be used is wider than the distance between the lugs on the front and rear bars 44 and 45.

The flask supporting frame is provided at each corner with a dependent rigid guiding pin 49; and these pins slide in the sockets 29 carried by the head 24. These guide pins assist in accurately guiding the pattern plate holding frame during the pattern drawing operation. When the flask holding frame is in its lowermost position, as shown in Fig. 1, it rests directly on the upper ends of the sockets 29 so that the said frame will partake of every movement of the pattern holding frame, except during the pattern drawing operation, as will be presently described. The guide pins 49 fit nicely in bushings fitted within the sockets 29, as shown clearly in Fig. 6.

The sockets 40 are provided with bushings in order to accurately guide the plunger rods 41, and each socket is enlarged internally at a point about midway its ends to form a large oil chamber 50, which chamber may be provided with any suitable form of oil filling cap and with a closure plate 51. Mounted in each chamber 50 is a horizontal rock shaft 52 which carries a locking dog 53 which extends upwardly and outwardly and is adapted to engage one of a series of notches 54 in the plunger rod 41. The rear ends of the rock shafts extend through the frames 4 and 5 and each carries a crank arm 55, one of said arms extending upwardly and the other downwardly, as shown in dotted lines in Fig. 1. The outer ends of these arms are connected together by a link 56, so that said rock shafts will move in unison. Connected to the forward end of one of said rock shafts is a counter-balance weight 57 which tends to throw the locking dogs 53 into the notches 54. To the counter-balance weight is connected a downwardly extending foot lever 58. When it is desired to release the locking dogs from the notches 54 the foot lever is swung laterally by merely placing the foot on the lower end thereof. This lifts the counter-weight 57 and rocks the shaft 52 to throw the dogs out of engagement with the plunger rods. When the foot lever is released, the counter-weight automatically throws the locking dogs back into position to engage the notches in the plunger rods.

The chamber 50 and the lower portion of the socket 41 contain oil to form a cushioning device or dash pot in order to retard and cushion the drop of the flask supporting frame when the dogs 53 are released, as will be more fully hereinafter described. Each plunger rod is formed with a vertical groove 59 to facilitate the passage of the oil from the lower portion of the socket 41 up into the chamber 50 when the flask holding frame is moved downwardly.

During the jolting operation, which will be presently described, the pattern holding frame and the flask holding frame are accurately guided by means of the jolt-piston and the plunger rods 41. During the pattern drawing operation the pattern drawing frame and the pattern plate are accurately guided by the four guide pins 49 and the large squeeze-piston 16. When the flask holding frame is permitted to drop down to its normal position it is guided by the plunger rods 41 and also by the four guide pins 49 moving downwardly in the sockets 29. It will, therefore, be seen that I provided means for very accurately guiding all of the vertically reciprocating parts.

Figures 9, 10, 11, 12, 13, 14, 15:
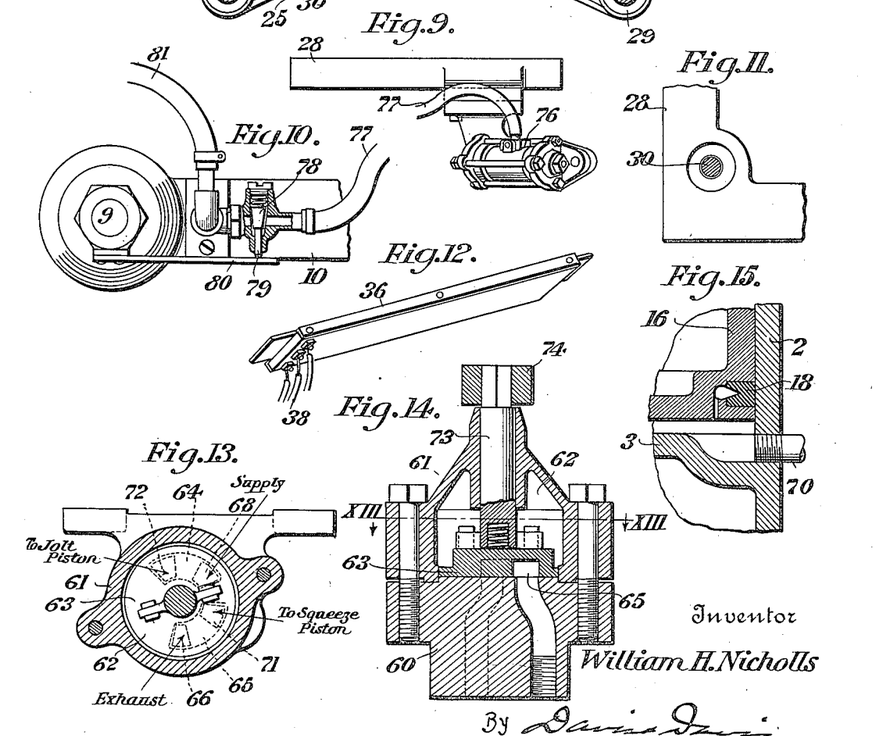
Fig. 9 a side elevation of the pattern plate holding frame with the automatic vibrator attached.
Fig. 10 a detail plan view partly in section of the pressure head supporting arm showing the means for automatically opening the vibrator valve.
Fig. 11 a detail view showing the means for fastening the pattern plate holding frame.
Fig. 12 a detail view of the electric heater.
Fig. 13 a horizontal sectional view of the air valve taken on the line XIII—XIII of Fig. 14.
Fig. 14 a vertical sectional view of the air valve.
Fig. 15 a detail view of the lower end of the mold squeezing piston.

The supply of compressed air to the jolt and squeeze pistons is controlled by a single valve mounted on the head 7 and consisting of a base 60 and a casing 61 mounted thereon and forming a valve chamber 62. In the valve chamber is mounted a rotatable flat valve 63 having two arc-shape concentric passages 64 and 65 in its under surface. The base is formed with an exhaust port 66, the outlet from which is controlled by a small valve 67 so that by adjusting said valve the rate of exhaust may be regulated. The base is also formed with a port 68 which is adapted to be connected to an air supply by means of pipe 69. Pipe 70 connects the lower end of the cylinder 2 with a port 71; and pipe 23 from the jolt-piston is connected to port 72.

The rotary valve is connected to valve stem 73 by any suitable means and said stem is provided at its upper end with an operating handle 74. By rotating the valve to the desired position, air, or other fluid under pressure, may be admitted to operate the jolt-piston, or to operate the squeeze-piston or to exhaust the air from under the squeeze-piston. In the position shown in Fig. 13 the ports are arranged to admit air under the jolt-piston, the squeeze-piston cylinder being open to atmosphere through exhaust port 66. A partial rotation of the valve clock-wise will connect the supply to the squeeze-piston by means of passage 64. A continued rotation of the valve clockwise will connect the squeeze-piston to the exhaust, the supply and jolt-piston ports being closed.

Figure 6:
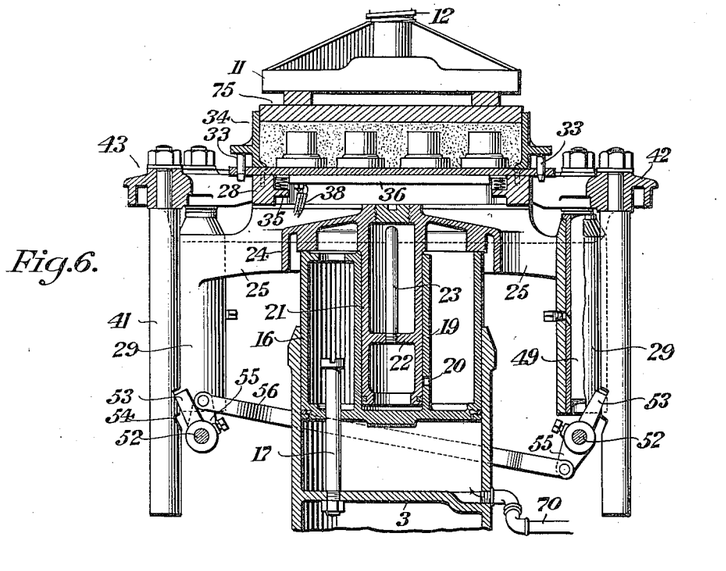
Fig. 6 a sectional view of a portion of the machine showing the operating pistons and the flask and pattern supporting means in the mold squeezing position.
Figure 7:
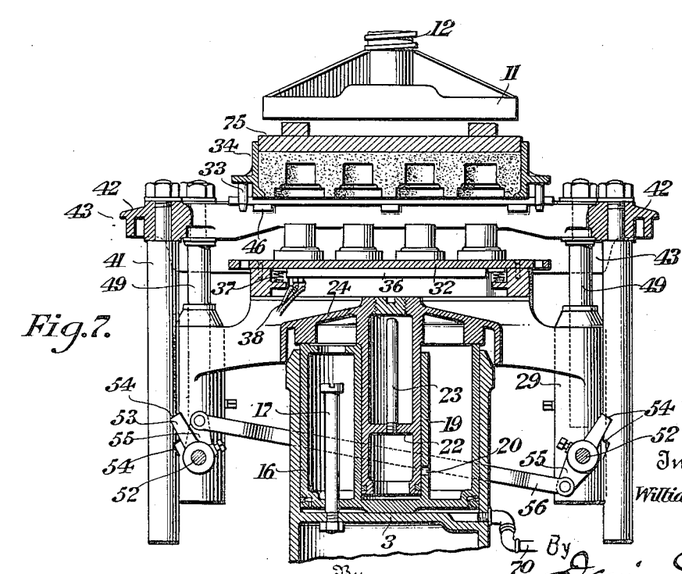
Fig. 7 a view similar to Fig. 6 showing the patterns withdrawn from the mold.
Figure 8:
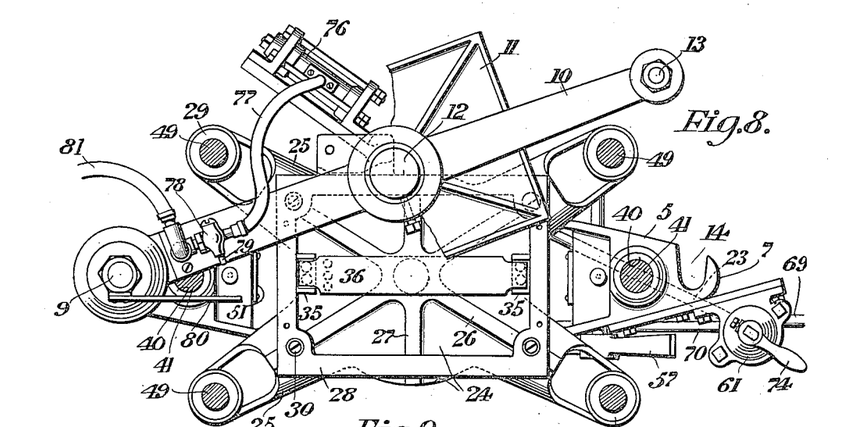
Fig. 8 a plan view with the pressure head supporting arm swung rearwardly and laterally and the flask supporting member removed, the flask supporting guide and sustaining rods being shown in horizontal section.

The operation of forming a mold may be briefly described as follows:

With the jolt and squeeze-pistons in their lowermost position and the flask holding frame at rest, as shown in Fig. 1, the flask is placed in position on the pattern plate and on the flask holding frame. The flask is then filled with sand and the valve handle turned to place the handle in the position shown in Fig. 13. This permits air to pass through pipe 23 to lift the jolt-piston, head 24 and flask carrying frame, until the exhaust port 20 is uncovered. Air will then exhaust from beneath the jolt-piston and permit said piston and the parts carried thereby to drop until the head 24 contacts with the upper edge of the main piston 2. This causes the jolting of the sand about the pattern. This jolting operation is continued until the sand is nicely packed around the patterns. The handle 74 is then turned to stop the jolting operation after which the flask is filled smoothly with sand and the presser board 75 is placed in position in the flask, as shown in Fig. 1. The air valve is then rotated to supply air through pipe 70 under the squeeze-piston. This forces upwardly the piston 16 which carries with it the head 24 and the flask-carrying frame until the presser board 75 contacts with the pressure head 11. The pressure head 11 is so positioned that when the squeezing operation is complete the dogs 53 drop into one set of notches in the plunger rods 41. The locking notches 54 and the pressure head 11 are so placed with respect to each other that when the squeezing operation is complete there is a slight space between the upper ends of the locking dogs and the upper walls of the notches, as shown in Fig. 6. The purpose of this is to permit the flask holding frame to drop slightly away from the pressure head to relieve the pressure on the mold before the pattern drawing operation begins. As shown in Fig. 7, the presser board has dropped slightly away from the pressure head 11 and the locking dogs 53 are firmly engaged against the upper walls of the locking notches in the plunger rods 41.

When the pressing operation is complete the air valve is turned to exhaust air from beneath the piston 16. This permits the pistons and the head 24, the pattern plate holding frame and the attached pattern plate, to drop, but the dogs 53 hold the flask carrying frame in its upper position. As previously described, the pattern plate holding frame and the pattern plate are guided in their downward drawing movement by the four guide pins 49 and by the large squeeze-piston 16 moving downwardly in the cylinder 2. The guide pins 49 are held rigidly through their connection with the flask holdng frame and the plunger rods 41 which during this pattern drawing operation are locked by the dogs 53.

When the drawing operation is completed the arm 10 carrying the pressure head 11 is swung rearwardly, the rod 13 being released from the slot 14 in the head 7, and then the mold may be removed from the flask-carrying frame. After the removal of the completed mold the foot lever 58 is operated to release the dog 53 and the flask-carrying frame is permitted to drop down in position to receive another flask.

It is to be noted that the heating element 36 is not rigidly connected to the pattern plate but is held in position when the pattern plate is secured to the pattern plate holding frame. By this means the heating element will serve for any pattern plate that may be secured to the holding frame.

In order to facilitate the withdrawal of the patterns form the sand molds, it is desirable to slightly vibrate the pattern holding plate. To accomplish this I rigidly connect to one side of the pattern plate holding frame a pneumatic vibrator 76 which may be of any suitable construction designed to produce a slight tapping or jarring of the pattern plate holding frame. This vibrator is supplied with air by a pipe 77 which is provided with an automatic valve 78 mounted on the top of the arm 10 near the post 9. As shown in Fig. 10, this valve is seated by a spring and is provided with a stem 79 which is adapted to engage a rigid stop 80, mounted on the post 9, when the arm 10 is swung into position to bring the pressure head 11 directly over the flask. Air is supplied to the valve 78 through a pipe 81 which leads to any source of supply.

When the pressure plate 11 is swung into position over the flask the vibrator is automatically set in operation through the opening of valve 78 and continues to operate and to vibrate the pattern plate frame until the arm 10 is swung rearwardly after the completion of the mold, as hereinbefore described.

It is manifest that any form of vibrator may be connected to the pattern plate holding frame and any automatic means for setting the vibrator in operation may be arranged in connection with the swinging arm 10. The vibrator may be connected to any suitable part of the molding machine, it being only necessary that the impulses from said vibrator shall be imparted to the pattern carrying plate during the pattern drawing operation. The slight spaces around the screws 30 permit of the effective vibration of the pattern plate holding frame and, of course, of the pattern plate.

The flask frame is open and considerably longer than the ordinary pattern plate so that pattern plates of various sizes may be attached to the plate supporting frame 28 without interfering with the proper up-and-down operation of the flask supporting frame.

What I claim is:

1. In a molding machine, the combination of a support, a large squeeze-piston mounted in said support, a smaller jolt-piston mounted centrally in the squeeze-piston, a valve for controlling a supply of fluid under pressure to said pistons, a head carried by the upper end of the jolt-piston and adapted to bear on the upper end of the squeeze-piston, a pattern plate holding frame secured to said head, laterally extending diagonal arms carried by said head, each of said arms being formed with a depending socket at its outer end, an open substantially rectangular flask supporting frame surrounding the pattern plate holding means and adapted to rest on the said diagonal arms, depending guide pins carried by said frame and fitting in the said sockets, depending plunger rods carried by the end bars of the said supporting frame and adapted to reciprocate in vertical sockets formed in the support at opposite sides of the pistons, means for locking the flask supporting frame in its upper position after the squeezing operation, and a presser head above the flask supporting frame.

2. In a molding machine, the combination of a support, a large squeeze-piston mounted in said support, a smaller jolt-piston mounted centrally in the squeeze-piston, a valve for controlling a supply of fluid under pressure to said pistons, a head carried by the upper end of the jolt-piston and adapted to bear on the upper end of the squeeze-piston, a pattern plate holding frame secured to said head, laterally extending diagonal arms carried by said head, each of said arms being formed with a depending socket at its outer end, an open substantially rectangular flask supporting frame surrounding the pattern plate holding means and adapted to rest on the said diagonal arms, removable flask supporting rails mounted on the front and rear bars of the flask supporting frame and adapted to support a flask member, depending guide pins carried by said frame and fitting in the said sockets, depending plunger rods carried by the end bars of the said supporting frame and adapted to reciprocate in vertical sockets formed in the support at opposite sides of the pistons, means for locking the flask supporting frame in its upper position after the squeezing operation, and a presser head above the flask supporting frame.

3. In a molding machine, the combination of a support, a large squeeze-piston mounted in said support, a smaller jolt-piston mounted centrally in the squeeze-piston, a valve for controlling a supply of fluid under pressure to said pistons, a head carried by the upper end of the jolt-piston and adapted to bear on the upper end of the squeeze-piston, a pattern plate holding frame secured to said head, laterally extending diagonal arms carried by said head, each of said arms being formed with a depending socket at its outer end, an open substantially rectangular flask supporting frame surrounding the pattern plate holding means and adapted to rest on the said diagonal arms, depending guide pins carried by said frame and fitting in the said sockets, depending plunger rods carried by the end bars of the said supporting frame and adapted to reciprocate in vertical sockets formed in the support at opposite sides of the pistons, means for automatically engaging the plunger rods to lock the flask supporting frame in its upper position, and a presser head mounted above the flask supporting frame and adapted to press the sand about the pattern when the pistons are moved upwardly for the mold squeezing operation.

4. In a molding machine, the combination of a base, a pattern plate holding means, means for reciprocating said holding means rapidly to jolt the sand about the pattern, a presser head, means for moving the pattern plate holding means to the presser head for the mold squeezing operation, an open substantially rectangular flask-holding frame surrounding the pattern plate holding means, means for guiding said flask-holding frame on the pattern plate holding means, a pair of depending plunger rods carried by the flask holding frame and sliding in sockets formed in the base, and means for automatically engaging said plunger rods when the pattern plate holding means is moved upwardly to engage the presser head for the mold squeezing operation and serving to lock the flask holding frame in its upper position while the pattern plate holding means may be lowered to withdraw the pattern from the mold.

5. In a molding machine, the combination of a base, a pattern plate holding means, means for giving to said holding means a sand jolting operation and a mold squeezing operation, a flask support surrounding the pattern plate holding means and adapted to move upwardly with said holding means during the jolting and squeezing operations, means for locking the flask support in its upper position during the squeezing operation to permit the pattern plate holding means to move downwardly to draw the pattern from the mold, means for releasing the flask support, plunger rods connected to the flask support and guided in the base, and oil chambers surrounding the lower ends of said plunger rods and serving as dash pots to cushion the drop of the flask support when its locking means is released.

6. In a molding machine, the combination of a base, a pattern plate holding means, a flask support surrounding the pattern plate holding means and adapted to move upwardly with said holding means during the mold forming operation, means for giving to said flask and pattern holding means an upward mold squeezing movement, means for locking the flask holding means in its upper position when the mold squeezing operation is complete to permit the pattern plate holding means to move downward independently to draw the pattern from the mold, means for releasing the flask holding means, and plunger rods connected to the flask holding means and guided in the base, said base being formed with oil chambers surrounding the lower ends of said plunger rods and serving as dash pots to cushion the drop of the flask holding means when its locking means is released.

7. In a molding machine, the combination of a support, a pattern plate holding means, means for giving to said holding means a mold squeezing operation, a flask holding means surrounding the pattern plate holding means and adapted to move upwardly with said holding means during the squeezing operation, a pair of depending plunger rods carried by the flask holding frame, sockets formed in the base to receive said plunger rods and forming oil chambers, locking dogs in said sockets and adapted to automatically engage the plunger rods to lock the flask holding means in its upper position after the mold squeezing operation, and means for releasing said dogs.

8. In a molding machine, the combination of a support, a pattern plate holding means, means for giving to said holding means a mold squeezing operation, a flask holding means surrounding the pattern plate holding means and adapted to move upwardly with said holding means during the squeezing operation, a pair of depending plunger rods carried by the flask holding means, sockets formed in the base to receive said plunger rods forming oil chambers, locking dogs in said sockets and adapted to automatically engage the plunger rods to lock the flask holding means in its upper position after the mold squeezing operation, means for releasing said dogs, and a foot lever connected to said locking dogs to release said dogs from the plungers to permit the flask holding means to drop.

9. In a molding machine, the combination of a pattern plate holding frame, a pattern plate removably secured thereto, an electric heating element held in the pattern plate holding frame by the pattern plate, and means for yieldingly pressing the heating element upwardly against the under side of the pattern plate.

10. In a molding machine, the combination of a support, means for holding a pattern plate and flask, means for giving to said holding means jolting and squeezing movements, a horizontally swinging arm, a pressure head mounted in said arm and adapted to be swung directly over the pattern plate and flask, a vibrator adapted to vibrate the pattern plate, and means for automatically setting said vibrator in operation when the swinging arm is moved to bring the pressure head directly over the pattern plate and flask for the squeezing operation, said means also automatically cutting out said vibrator from operation when the swinging arm is moved to take the pressure head away from its pressing position.

11. In a molding machine, the combination of a support, means for holding a pattern plate, means for holding a flask, means for moving said holding means to squeeze the sand about the pattern, a horizontally swinging arm, a pressure head mounted in said arm and adapted to be swung directly over the pattern plate and flask, a vibrator adapted to vibrate the pattern plate, and means operated by the swinging arm to automatically set the vibrator in operation when the pressure head is directly over the pattern plate and flask for the squeezing operation, said means also automatically rendering the vibrator inoperative when the swinging arm is moved to take the pressure head away from its pressing position directly over the flask.

12. In a molding machine, the combination of a support, means for holding a pattern plate, means for holding a flask, means for moving said holding means to squeeze the sand about the pattern, a swinging arm, a pressure head mounted on said arm and adapted to be swung directly over the pattern plate and flask, a pneumatic vibrator adapted to vibrate the pattern plate, a pipe connected to said pneumatic vibrator, a normally closed valve in said pipe, and means for automatically opening said valve when the swinging arm is moved to bring the pressure head directly over the pattern plate and flask, said valve automatically closing to stop the vibrator when the swinging arm is moved to take the pressure head away from its pressing position.

13. In a molding machine, the combination of a base, a pattern plate holding frame, a flask supporting means, means for giving the pattern plate holding frame and the flask supporting means a movement to squeeze the sand about the pattern, a swinging arm, a pressure head mounted on said arm and adapted to be swung directly over the pattern plate and flask, a vibrator mounted on the pattern plate holding frame, and means for automatically setting said vibrator in operation when the pressure head is moved over the flask and pattern plate for the squeezing operation, said means automatically rendering the vibrator inoperative when the pressure head is moved away from its pressing position.

14. In a molding machine, the combination of a base, a pattern plate holding means, means for giving to said holding means a mold squeezing operation, an open substantially rectangular flask supporting frame surrounding the pattern plate holding means, and front and rear flask supporting rails removably secured to the front and rear bars of the flask supporting frame.

15. In a molding machine, the combination of a base, a pattern plate holding means, means for giving to said holding means a mold squeezing operation, an open substantially rectangular flask supporting frame surrounding the pattern plate holding means, and means for varying the width of said flask holding frame.

16. In a molding machine the combination of a base, a pattern plate holding means, a presser head, means for moving the pattern plate holding means to the presser head for the mold squeezing operation, a flask holding frame surrounding the pattern plate holding means, means for guiding the flask holding frame on the pattern plate holding means, and means carried by the flask holding frame and engaging the base to guide the flask holding frame on the base and to lock said flask holding frame and the pattern plate holding means against horizontal movement.

17. In a molding machine the combination of a base, a pattern plate holding means, a presser head, an open flask holding frame surrounding the pattern plate holding means, the flask receiving surface of said frame being flush with the upper surface of the pattern plate when mounted on the holder whereby the flask mounted on the said frame will engage the upper surface of a pattern plate in position on the pattern plate holding means, means for moving the pattern plate holding means and the flask holding frame to the presser head for the mold squeezing operation, means for guiding said pattern plate holding means on the flask holding frame, and means for guiding said flask holding frame on the base of the machine.

18. In a molding machine the combination of a base, a large squeeze piston mounted in said base, a smaller jolt piston mounted centrally in the squeeze piston, a single valve for controlling the supply of fluid under pressure to each of said pistons, a head carried by the upper end of the jolt piston and adapted to bear on the upper end of the squeeze piston, a pattern plate holding frame secured to said head, an open flask supporting frame surrounding the pattern plate holding frame, means carried by the flask holding frame and engaging the pattern frame supporting means to lock said parts together against relative horizontal movement, and means carried by the flask supporting frame and engaging the base to lock the said frame against horizontal movement relative to the base.

19. In a molding machine the combination of a base, a large squeeze piston mounted in said base, a smaller jolt piston mounted centrally in the squeeze piston, a single valve for controlling the supply of fluid under pressure to each of said pistons, a head carried by the upper end of the jolt piston and adapted to rest on the upper end of the squeeze piston, laterally extending arms carried by said head, a pattern holding frame secured centrally to said head, an open substantially rectangular flask supporting frame surrounding the pattern plate holding frame and adapted to rest on the arms of the said head, guide means connected to the flask supporting frame and engaging the arms of the head, and depending guide means carried by the flask holding frame and engaging the base, the upper surface of the pattern plate when mounted in the holding frame being flush with the flask receiving surface of the flask supporting frame whereby the flask may be supported on the flask holding frame and on a pattern plate mounted on the pattern holding frame.

20. In a molding machine the combination of a base, a pattern plate holding means, a presser head, means for moving the pattern plate holding means to the presser head for the mold squeezing operation, a flask holding frame surrounding the pattern plate holding means, means for guiding the flask holding frame on the pattern plate holding means, means carried by the flask holding frame and engaging the base to guide the flask holding frame on the base and to lock said flask holding frame and the pattern plate holding means against horizontal movement, and means for locking the flask supporting frame in its upper position after the squeezing operation.

21. In a molding machine the combination of a base, a pattern plate holding means, a presser head, means for moving the pattern plate holding means to the presser head for the mold squeezing operation, a flask holding frame surrounding the pattern plate holding means, means for guiding the flask holding frame on the pattern plate holding means, means carried by the flask holding frame and engaging the base to guide the flask holding frame on the base and to lock said flask holding frame and the pattern plate holding means against horizontal movement, and means for automatically locking the flask supporting frame in its upper position after the squeezing operation.

22. In a molding machine, the combination of a base, a pattern plate holding means, means for reciprocating said holding means rapidly to jolt the sand about the pattern, a presser head, means for moving the pattern plate holding means to the presser head for the mold squeezing operation, an open substantially rectangular flask-holding frame surrounding the pattern plate holding means, means for guiding said flask-holding frame on the pattern plate holding means, a pair of depending plunger rods carried by the flask holding frame and sliding in sockets formed in the base, and means for automatically engaging said plunger rods when the pattern plate holding means is moved upwadly to engage the presser head for the mold squeezing operation and serving to lock the flask holding frame in its upper position while the pattern plate holding means may be lowered to withdraw the pattern from the mold.

23. In a molding machine the combination of a base, a pattern plate holding means, a presser head, an open flask holding frame surrounding the pattern plate holding means, the flask receiving surface of said frame being flush with the upper surface of the pattern plate when mounted on the holder whereby a flask mounted on the said frame will engage the upper surface of a pattern plate in position on the pattern plate holding means, means for moving the pattern plate holding means and the flask holding frame to the presser head for the mold squeezing operation, means for guiding said pattern plate holding means on the flask holding frame, means for guiding said flask holding frame on the base of the machine, and a device mounted on the base and adapted to engage the means for guiding the flask holding frame to lock said frame in its upper position after the mold squeezing operation.

24. In a molding machine the combination of a base, a pattern plate holding means, a presser head, an open flask holding frame surrounding the pattern plate holding means, the flask receiving surface of said frame being flush with the upper surface of the pattern plate when mounted on the holder whereby a flask mounted on the said frame will engage the upper surface of a pattern plate in position on the pattern plate holding means, means for moving the pattern plate holding means and the flask holding frame to the presser head for the mold squeezing operation, means for guiding said pattern plate holding means on the flask holding frame, means for guiding said flask holding frame on the base of the machine, and a device mounted on the base and adapted to engage the means for guiding the flask holding frame to lock said frame in its upper position after the mold squeezing operation.

25. In a molding machine the combination of a base, a large squeeze piston mounted in said base, a smaller jolt piston mounted centrally in the squeeze piston, a single valve for controlling the supply of fluid under pressure to each of said pistons, a head carried by the upper end of the jolt piston and adapted to rest on the upper end of the squeeze piston, laterally extending arms carried by said head, a pattern holding frame secured centrally to said head, an open substantially rectangular flask supporting frame surrounding the pattern plate holding frame and adapted to rest on the arms of the said head, guide means connected to the flask supporting frame and engaging the arms of the head, depending guide means carried by the flask holding frame and engaging the base, the upper surface of the pattern plate holding frame being slightly below the flask receiving surface of the flask supporting frame whereby the flask may be supported on the flask holding frame and on a pattern plate mounted on the pattern holding frame, and means for locking the flask supporting frame in its upper position after the squeezing operation.

26. In a molding machine the combination of a base, a large squeeze piston mounted in said base, a smaller jolt piston mounted centrally in the squeeze piston, a single valve for controlling the supply of fluid under pressure to each of said pistons, a head carried by the upper end of the jolt piston and adapted to rest on the upper end of the squeeze piston, laterally extending arms carried by said head, a pattern holding frame secured centrally to said head, an open substantially rectangular flask supporting frame surrounding the pattern plate holding frame and adapted to rest on the arms of the said head, guide means connected to the flask supporting frame and engaging the arms of the head, depending guide means carried by the flask holding frame and engaging the base, the upper surface of the pattern plate holding frame being slightly below the flask receiving surface of the flask supporting frame whereby the flask may be supported on the flask holding frame and on a pattern plate mounted on the pattern holding frame, and means for locking the flask supporting frame in its upper position after the squeezing operation.

In testimony whereof I hereunto affix my signature.

WILLIAM H. NICHOLLS.